US011958501B1

(12) United States Patent
Schleede

(10) Patent No.: US 11,958,501 B1
(45) Date of Patent: Apr. 16, 2024

(54) PERFORMANCE-BASED METRICS FOR EVALUATING SYSTEM QUALITY

(71) Applicant: Zoox, Inc., Foster City, CA (US)

(72) Inventor: Peter Scott Schleede, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 188 days.

(21) Appl. No.: 17/113,879

(22) Filed: Dec. 7, 2020

(51) Int. Cl.
*B60W 60/00* (2020.01)
*B60W 30/09* (2012.01)
*B60W 30/095* (2012.01)
*B60W 50/00* (2006.01)
*G07C 5/08* (2006.01)

(52) U.S. Cl.
CPC ........ *B60W 60/0011* (2020.02); *B60W 30/09* (2013.01); *B60W 30/0956* (2013.01); *B60W 50/0097* (2013.01); *G07C 5/085* (2013.01); *B60W 2420/40* (2013.01); *B60W 2420/403* (2013.01); *B60W 2420/54* (2013.01); *B60W 2555/20* (2020.02)

(58) Field of Classification Search
CPC ............... B60W 30/09; B60W 30/095; B60W 30/0956; B60W 40/105; B60W 40/04; B60W 50/0097; B60W 50/0205; B60W 60/0011; B60W 60/0027; B60W 60/00272; B60W 60/00274; B60W 2420/40; B60W 2420/42; B60W 2420/54; B60W 2420/403; B60W 2520/10; B60W 2555/20; B60W 2554/80; B60W 2554/801; B60W 2554/802; B60W 2554/806; G07C 5/085; G07C 5/0808; G07C 5/0841
See application file for complete search history.

(56) References Cited

U.S. PATENT DOCUMENTS

| | | | |
|---|---|---|---|
| 9,612,123 B1 | 4/2017 | Levinson et al. | |
| 10,353,390 B2 | 7/2019 | Linscott et al. | |
| 10,919,524 B2* | 2/2021 | Poledna | B60W 30/0956 |
| 2017/0249787 A1* | 8/2017 | Remboski | G07C 5/12 |
| 2019/0344798 A1* | 11/2019 | Motomura | G05D 1/0061 |
| 2020/0101974 A1* | 4/2020 | Ha | G05D 1/0088 |
| 2020/0361452 A1* | 11/2020 | McGill | B60W 50/045 |
| 2021/0070286 A1* | 3/2021 | Green | G05D 1/0088 |
| 2021/0261156 A1* | 8/2021 | Ackenhausen | B60W 60/0025 |
| 2022/0084405 A1* | 3/2022 | Zhang | G08G 1/0145 |
| 2022/0250631 A1* | 8/2022 | Klintberg | G05D 1/00 |

* cited by examiner

Primary Examiner — Russell Frejd
Assistant Examiner — Brandon Z Willis
(74) Attorney, Agent, or Firm — Lee & Hayes, P.C.

(57) ABSTRACT

Techniques relating to performance-based metrics for evaluating system quality are described. In an example, sensor data associated with an environment within which a vehicle is positioned is received. A performance metric associated with a trajectory, indicative of a performed behavior of the vehicle, can be determined and a correctness metric can be determined based at least in part on the performance metric. The correctness metric can represent a correctness of the performed behavior. Modification(s) to component(s) and/or system(s), or portions thereof, of the vehicle can be affected based at least in part on the correctness metric.

20 Claims, 5 Drawing Sheets

PERFORMANCE-BASED METRICS FOR EVALUATING SYSTEM QUALITY

BACKGROUND

An autonomous vehicle can be a vehicle capable of performing all safety-critical functions for an entire trip, with the driver (or occupant) not being expected to control the vehicle at any time. In such an example, since the vehicle can be configured to control all functions from start to stop, including all parking functions, it can be driverless. However, because of the complexity of system(s) associated with such vehicle(s), characterizing performance of the system(s) may be difficult, especially where the complexity of the system(s) is evaluated with respect to complex scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
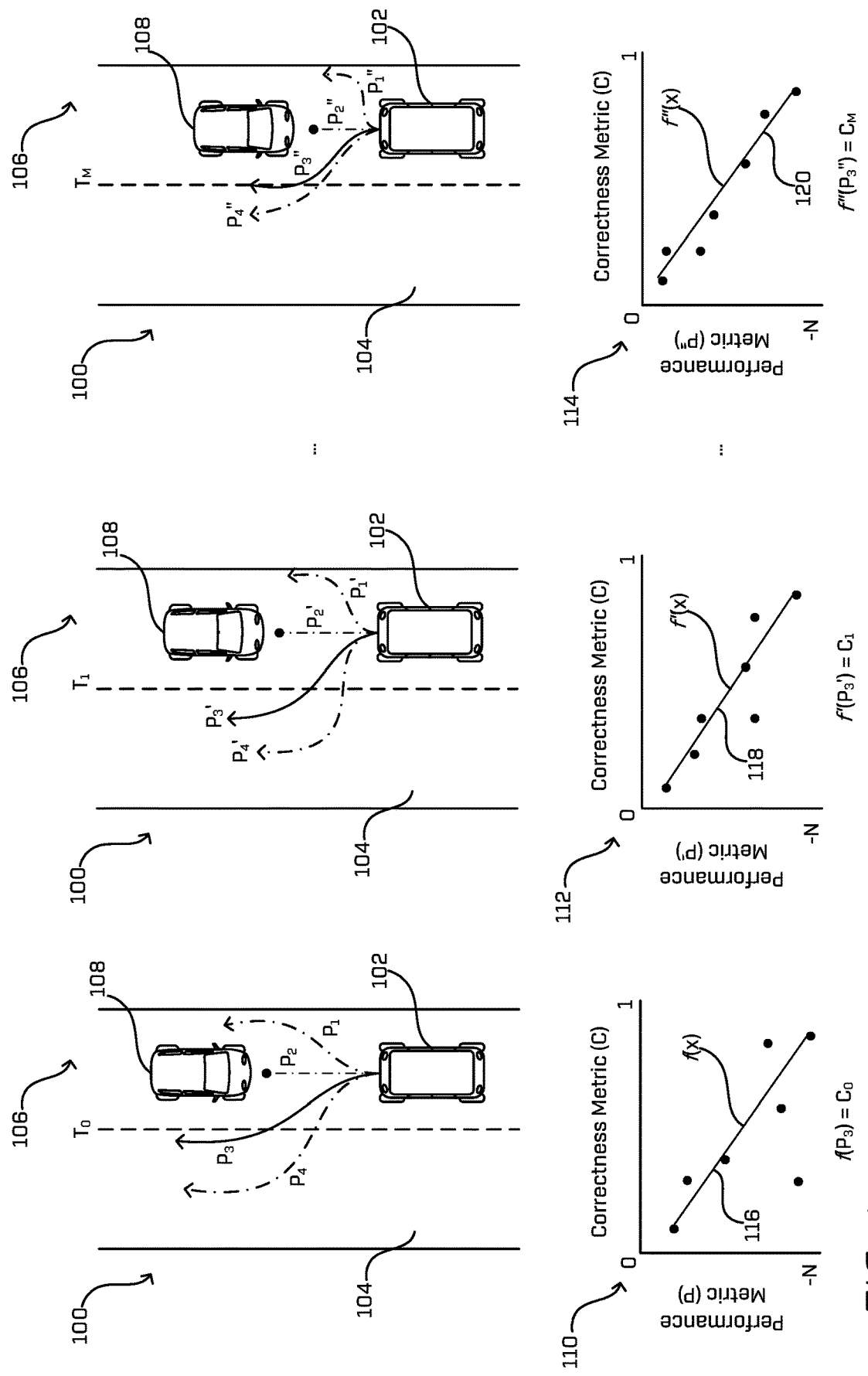
FIG. 1 illustrates an example environment for determining performance metric(s) and/or correctness metric(s) for a scenario, as described herein.

Evaluating system quality using performance-based metrics is described. In some examples, metrics can be used to evaluate the quality, and thus performance, of component(s) and/or system(s) such as those associated with an autonomous vehicle. Some metrics, such as progress (e.g., a velocity-based metric) and proximity (e.g., a closeness-based metric), can provide an indication of performance at a particular time, for a particular scenario. For instance, in some examples, progress and proximity metrics can be used to determine a performance metric, which can indicate a performance of the vehicle (e.g., the component(s) and/or system(s) associated therewith). A "good" performance metric (e.g., a performance metric that meets or exceeds a threshold) can indicate that the quality of the component(s) and/or system(s) is optimal. A "bad" performance metric (e.g., a performance metric that is below the threshold) can indicate that the quality of the component(s) and/or system(s) is sub-optimal and thus may require an update and/or modification.

However, in some examples, the performance metric may not fully reflect the quality of the component(s) and/or system(s). For example, the performance metric may penalize behavior that was sub-optimal but was correct in the given scenario. As an example, if a vehicle brakes quickly (e.g., slams on its brakes) and stops near another vehicle, the performance metric—based on progress and proximity—may be below the threshold indicating that the performance of the vehicle was poor. However, if the other vehicle suddenly merged into the lane of the vehicle (e.g., cutoff the vehicle), the quick braking may have been the correct behavior (e.g., the best behavior), given the scenario. Techniques described herein are directed to performance-based metrics that take into account performance (e.g., based on progress and proximity) and correctness to evaluate the quality of component(s) and/or system(s) of a vehicle, such as an autonomous vehicle.

In at least one example, a scenario involving a vehicle and another object (e.g., another vehicle, a cyclist, a pedestrian, etc.) can be detected in an environment of the vehicle. In at least one example, a plurality of trajectories can be generated for the scenario. Each trajectory can be associated with a behavior, such that when the trajectory is executed (e.g., commands associated therewith), the vehicle performs the behavior. In at least one example, each trajectory can be associated with a progress metric and a proximity metric. The progress metric can be based at least in part on a velocity of the vehicle (e.g., as determined by a simulation of executing the corresponding trajectory). The proximity metric can be based at least in part on a distance between the vehicle the other object (e.g., as determined by a simulation of executing the corresponding trajectory). In at least one example, a performance metric can be determined for each trajectory based at least in part on the progress metric and the proximity metric for the trajectory. That is, a performance metric can be determined for each trajectory based at least in part on simulating the trajectory (and thus determining what would have happened if the trajectory was executed) and determining the progress metric and the proximity metric for the trajectory.

The resulting plurality of performance metrics can be used to generate a plot from which a function (e.g., a line of best fit) can be determined. In at least one example, the function can be used to determine a correctness metric indicating whether a performed behavior of the vehicle was the correct behavior (i.e., the least incorrect) to perform, given the scenario (e.g., did the vehicle react well, given the scenario?). The correctness metric can be used to evaluate quality of component(s) and/or system(s) of the vehicle. If the correctness metric meets or exceeds a threshold, an update and/or modification can be made to component(s) and/or system(s) to improve the performance of the component(s) and/or system(s). For example, a developer can modify software code utilized by such component(s) and/or system(s), sensor component(s) and/or system(s) can be calibrated and/or recalibrated, etc. Similarly, such metrics may be used for reinforcement learning on the vehicle (e.g., using on-line training of machine learned systems for continuous improvement) or for informing the vehicle of a maneuver to perform (either presently or in the future). That is, the correctness metric can be used to evaluate quality of the component(s) and/or system(s) and to make improvements in circumstances where quality is sub-optimal to thereby improve the quality of the component(s) and/or system(s) of the vehicle.

Techniques described herein can be utilized to improve the performance and thus safety of vehicles that are controlled by component(s) and/or system(s). That is, techniques described herein relate to performance-based metrics that not only evaluate performance of component(s) and/or system(s) of a vehicle, but do so in the context of how correctly the component(s) and/or system(s) performed in view of what the component(s) and/or system(s) could have done. As described above, the correctness metric provides an indication of fault to evaluate whether the component(s) and/or system(s) performed poorly due to their poor quality and/or because of the scenario. When it is determined that the component(s) and/or system(s) performed poorly due to their quality, improvements (e.g., an update and/or modification) can be made to improve the performance of the component(s) and/or system(s). Thus, techniques described herein can leverage performance-based metrics to evaluate, and improve, the performance and safety of vehicles, such as autonomous vehicles.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. In one example, the techniques described herein may be utilized in driver-controlled vehicles. In another example, the techniques can be utilized in an aviation or nautical context, or in any context involving transportation of one or more passengers. That is, while techniques described herein are described with reference to autonomous vehicles, techniques described herein can be applied in additional or alternative contexts.

FIG. 1 illustrates an example environment 100 for determining performance metric(s) and/or correctness metric(s) for a scenario, as described herein. The example environment 100 is depicted at three different instances of time (e.g., $T_0$, $T_1$, and $T_M$). Such instances can be associated with seconds, portions of seconds (e.g., one tenth of a second, one half of a second, etc.), or the like. While three instances of time are shown, techniques described herein can be performed at more or fewer than three instances of time.

In at least one example, a vehicle 102 can be positioned in the environment 100. In at least one example, the vehicle 102 can be an autonomous vehicle configured to operate according to a Level 5 classification issued by the U.S. National Highway Traffic Safety Administration, which describes a vehicle capable of performing all safety-critical functions for an entire trip, with the driver (or occupant) not being expected to control the vehicle at any time. In such an example, since the vehicle 102 can be configured to control all functions from start to stop, including all parking functions, it can be driverless. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 102 is an autonomous vehicle; however, the vehicle 102 could be any other type of vehicle.

In at least one example, the vehicle 102 can be driving on a road 104 in the environment 100. The road 104 can have one or more lanes. As illustrated in FIG. 1, the vehicle 102 is positioned in a lane 106 of the road 104. In at least one example, another object, illustrated as another vehicle 108, can be positioned in the same lane, travelling in a direction opposite the vehicle 102. That is, as illustrated in FIG. 1, the other vehicle 108 can be an oncoming in-lane vehicle. Techniques described herein, however, can be applicable to additional or alternative scenarios (e.g., cut-in scenario or merge scenario, etc.).

In at least one example, the vehicle 102 can have one or more vehicle computing devices, sensor component(s), emitter(s), and/or the like onboard the vehicle 102. Additional details associated with vehicle computing device(s), sensor component(s), emitter(s), and/or the like are described below with reference to FIG. 3. In at least one example, the sensor component(s) can generate sensor data that can represent the environment 100. In at least one example, a scenario can be detected in the sensor data and/or based on the sensor data. In some examples, a scenario can be detected using a classifier trained to identify particular scenarios including, but not limited to, an oncoming in-lane scenario (e.g., when another vehicle is in a same lane, travelling in an opposite direction of the vehicle 102), a cut-in or merge scenario (e.g., when another vehicle travels into a same lane of the vehicle 102, in front of the vehicle 102, and travelling in the same direction as the vehicle 102), etc. In some examples, a scenario can be detected based at least in part on detecting, from the sensor data and/or determination(s) based at least in part on the sensor data, that the vehicle 102 is proximate the other vehicle 108 (e.g., within a threshold distance of the other vehicle 108). In some examples, the sensor data can be obtained in real-time (e.g., while the vehicle 102 is travelling in the environment 100). In some examples, the sensor data can be obtained at a later time by accessing stored data logs associated with previous travel of the vehicle 102. In some examples, the sensor data can be simulated data.

In at least one example, a plurality of trajectories can be generated for the scenario, as illustrated in FIG. 1. In at least one example, a trajectory can represent a behavior of the vehicle 102. That is, a trajectory can comprise a sequence of commands that, when executed by a component and/or system of the vehicle 102, can control the vehicle 102 to perform a behavior. In some examples, the plurality of trajectories can be different combinations of jerk, acceleration (e.g., longitudinal or lateral), velocity, position, braking, etc. While four trajectories are shown, any number of trajectories can be generated. In at least one example, a plurality of simulations can be performed for the plurality of trajectories. That is, a simulation component can execute a trajectory to determine the associated behavior and performance metrics. In at least one example, the plurality of simulations can be performed programmatically (e.g., using quasi-Monte Carlo simulation, an optimization problem, and/or the like).

In at least one example, a trajectory can be associated with a progress metric and a proximity metric. In at least one example, the progress metric and the proximity metric can be determined for an instance of time. The instance of time can be associated with a period of time (e.g., a "window" of time). The trajectory can be executed (e.g., by simulation or otherwise) over the period of time to determine the progress metric and proximity metric for individual portions (e.g., steps, ticks, etc.) of the period of time. That is, for each "step" or "tick" of the trajectory during the period of time, a progress metric and a proximity metric can be determined. A sum, or other representative value, of the progress metrics can be determined and used as the progress metric for the instance of time. A sum, or other representative value, of the proximity metrics can be determined and used as the proximity metric for the instance of time.

In at least one example, the progress metric can be based at least in part on a velocity or speed of the vehicle 102 when the trajectory is executed (e.g., in a simulation). In at least one example, progress can be defined by the time taken for the vehicle 102 to arrive at a particular point in the environment 100, in the longitudinal (s) direction. To determine progress, a point on the vehicle 102 can be used (e.g., the front bumper of the vehicle 102). In at least one example, by measuring the time taken to arrive at the particular point, the average velocity can be determined. As such, when the vehicle 102 is forced to decelerate (e.g., due to the other vehicle 108), this can reflect a decreasing progress metric. Equation (1) provided below provides an example of how the progress metric for a trajectory can be determined.

$$\text{Progress} = -\text{alpha} * |\text{speed\_limit} - v\_x| \quad \text{Equation (1):}$$

In the Equation (1), $v\_x$ can represent the velocity of the vehicle 102 and the nominal average velocity can be represented as the speed_limit. Equation (1) can therefore penalize deviations from the nominal average velocity (e.g., there is zero cost to driving the speed limit). In additional or alternative examples, squares or other functions can be used to determine the progress metric, based at least in part on velocity and/or speed.

In at least one example, the proximity metric can be based at least in part on a distance between the vehicle 102 and the other vehicle 108 when the trajectory is executed (e.g., in a simulation). That is, the proximity metric can penalize the vehicle 102 for getting close to the other vehicle 108. In at least one example, cost can be incurred when the vehicle 102 is within a threshold distance of the other vehicle 108. In some examples, the threshold can be determined based at least in part on a desired stopping time of the vehicle 102 and/or the speed of the vehicle 102. Equations (2) and (3) provided below provide examples of how the proximity metric for a trajectory can be determined.

$$\text{Proximity(front): } -\text{beta} * (\text{vehicle\_stopping\_distance} - (\text{object\_}x - \text{vehicle\_}x)) \quad \text{Equation (2):}$$

In Equation (2), the vehicle_stopping_distance can be determined based at least in part on a kinematic equation, a dynamic simulation, and/or the like. In Equation (2), object_x and vehicle_x can refer to x-coordinates of the object (e.g., the other vehicle 108) and the vehicle 102. In Equation (2), cost can be incurred when a front bumper of the object (e.g., the other vehicle 108) is within a stopping distance of a front bumper of the vehicle 102 as measured along a path of the vehicle 102 and/or if some part of the object (e.g., the other vehicle 108) is in front of the front bumper of the vehicle 102 as measured relative to the path (e.g., by measuring perpendicular distance of points from a path of the vehicle 102 and comparing such measurements).

$$\text{Proximity(side): } -\text{gamma} * (\text{buffer} - (\text{object\_}y - \text{vehicle\_}y)) \quad \text{Equation (3):}$$

In Equation (3), the buffer can be a distance parameter indicating a desired distance between two objects (e.g., the vehicle 102 and the other vehicle 108) when passing or otherwise being within proximity thereof. In Equation (3), object_y and vehicle_y can refer to y-coordinates of the object (e.g., the other vehicle 108) and the vehicle 102. In Equation (3), cost can be incurred when a front bumper of the object (e.g., the other vehicle 108) is within a stopping distance of a front bumper of the vehicle 102 as measured along a path of the vehicle 102, if some part of the object (e.g., the other vehicle 108) is within buffer meters of the vehicle 102 laterally as measured relative to the path (e.g., by measuring perpendicular distance of points from a path of the vehicle 102 and comparing such measurements), and/or if a rear bumper of the object (e.g., the other vehicle 108) is ahead of the rear bumper of the vehicle 108 as measured along the path.

In some examples, the front and/or side proximity can be determined as the "proximity metric" described herein. As described above, in at least one example, an instance of time (e.g., $T_0$) can be associated with a period of time (e.g., a "window" of time) and at individual portions of the period of time—that can correspond to steps or "ticks" of the trajectory—a progress metric and proximity metric can be determined. The performance metric for the instance of time can be determined based on summing each metric across the period of time and determining a sum of each of the metrics. In some examples, additional or alternative metrics can be determined for individual trajectories. For example, a metric representative of a rate of change, smoothness of command(s), and/or the like can additionally or alternatively be determined.

In at least one example, a performance metric can be determined for each of the trajectories. In at least one example, the performance metric can be determined based at least in part on determining a sum of the progress metric and the proximity metric (e.g., by adding the progress metric to the proximity metric). In some examples, the performance metric can have a value between zero (0) and $-N$, wherein a performance metric close to zero indicates "good" performance and a performance metric close to $-N$ indicates "bad" performance. That is, a performance metric that meets or exceeds a threshold can indicate "good" performance and a performance metric that is below the threshold can indicate "bad" performance. Each of the trajectories can be associated with a performance metric (e.g., $P_1$-$P_4$). In at least one example, each of the performance metrics can be added to a graph associated with an instance of time associated with the scenario (e.g., $T_0$, $T_1$, $T_M$). That is, each performance metric can be added as a point in a graph, wherein the x-axis is associated with trajectory numbers and the y-axis is associated with performance metrics.

Three graphs 110, 112, and 114 are illustrated in FIG. 1. Each graph 110, 112, and 114 corresponds to an instance of time associated with the scenario (e.g., $T_0$, $T_1$, $T_M$). In each graph 110, 112, and 114, the performance metrics associated with each time are plotted in a graph corresponding to the time. In each graph 110, 112, and 114, the y-axis can be associated with the performance metrics and the x-axis can be a correctness metric, as described below. That is, the performance metrics for $T_0$ (e.g., $P_1$-$P_4$) are plotted in the graph 110, the performance metrics for $T_1$ (e.g., $P_1'$-$P_4'$) are plotted in the graph 112, and the performance metrics for $T_M$ (e.g., $P_1''$-$P_4''$) are plotted in the graph 114. In at least one example, each of the points on a graph can be a performance metric associated with a behavior that the vehicle 102 could have performed in the scenario. As such, the points on the graph 110 can represent different behaviors the vehicle 102 could have performed in the scenario and performance metrics associated therewith. Therefore, the graph 110 can be used to compare a performed behavior of the vehicle 102 with behaviors the vehicle 102 could have performed at the instance of time (e.g., at $T_0$) in the scenario. It should be noted that graphs, as described herein, are provided for illustrative purposes and may not be required for implementation. That is, while described in the context of generating a graph, in some examples, the performance metrics can be sorted and analyzed to determine a line of best fit and/or a function associated therewith (e.g., without generating a graph).

In at least one example, a line of best fit can be determined for each graph (118, 120, and 122). That is, in at least one example, a subset of performance metrics can be used to generate a line of best fit. In some examples, the subset can include the full set of performance metrics or some portion thereof. In some examples, the subset can include a "best" performance metric (e.g., closest to zero), a "worst" performance metric (e.g., most negative), and an average performance metric. In some examples, the subset can include additional or alternative performance metrics. In some examples, the "best" performance metric can have a corresponding correctness metric that indicates that the associated performed behavior was the "least incorrect" performed behavior. In some examples, the corresponding correctness metric can be zero (0) or within a threshold of zero (0). In some examples, the "worst" performance metric can have a corresponding correctness metric that indicates that the associated performed behavior was the "most incorrect" performed behavior. In some examples, the corresponding correctness metric can be one (1) or within a threshold of one (1). In some examples, one or more performance metrics between the "best" and the "worst" can have a corresponding correctness of five-tenths (0.5). In some examples, the line of best fit can be determined based at least in part on a regression analysis (e.g., linear quadradic, etc.), robust fitting (e.g., non-linear least squares, random sample consensus (RANSAC), etc.), etc. of the subset of performance metrics. In some examples, such a determination can utilize outlier rejection, curve fitting, and/or any other feature of regression analysis to determine the line of best fit.

In at least one example, the line can represent a function. In at least one example, the function can be used to determine a correctness metric representative of how correct the performed behavior (e.g., associated with a particular trajectory of the trajectories) was in the particular scenario (e.g., given possible behaviors the vehicle 102 could have performed). In at least one example, the correctness metric can be determined based at least in part on a performance metric. For example, for the trajectory associated with $P_3$, the function ($f(x)$) can be evaluated for $P_3$ to get the correctness metric for $T_0$. As illustrated in FIG. 1, the correctness metric, $C_0$, for $T_0$ can be determined by evaluating the function ($f(x)$) for $P_3$ (e.g., the performance score associated with the trajectory selected at $T_0$). The correctness metric, $C_0$, can indicate how correct the performed behavior associated with the trajectory corresponding to $P_3$ was, in the given scenario. For example, by determining the correctness metric, the performance of the selected trajectory (e.g., $P_3$) relative to a consensus measure across all trajectories can be determined. That is, the correctness metric, $C_0$, can represent a correctness of a performance of the vehicle 102 at $T_0$. In at least one example, a correctness metric can be associated with a value between zero (0) and one (1), wherein a correctness metric of one (1) indicates that the performed behavior was "incorrect" (e.g., the "least correct," most "incorrect," or "bad") and a value of zero (0) indicates that the performed behavior was "correct" (e.g., the "most correct," "least incorrect," or "good"). That is, a correctness metric with a value below a threshold can indicate a "correct" behavior and a correctness metric with a value that meets or exceeds the threshold can indicate an "incorrect" behavior. The correctness metric can differ from time to time. For example, $C_0$ (associated with $T_0$) can be different than $C_1$ (associated with $T_1$), which can be different than $C_M$ (associated with $T_M$).

In some examples, instead of, or in addition to, sorting and/or analyzing the performance metrics as described above, the performance metrics can be ranked from low to high (e.g., most negative to least negative) and fit a function to the ranked performance metrics. In such an example, the performance metrics can include a "best" performance metric (e.g., closest to zero), a "worst" performance metric (e.g., most negative), and an average performance metric. In some examples, the "best" performance metric can have a corresponding correctness metric that indicates that the associated performed behavior was the "least incorrect" performed behavior. In some examples, the corresponding correctness metric can be zero (0) or within a threshold of zero (0). In some examples, the "worst" performance metric can have a corresponding correctness metric that indicates that the associated performed behavior was the "most incorrect" performed behavior. In some examples, the corresponding correctness metric can be one (1) or within a threshold of one (1). In some examples, one or more performance metrics between the "best" and the "worst" can have a corresponding correctness of 0.5.

In at least one example, a correctness metric can be determined for each instance of time (e.g., $T_0$-$T_M$) by evaluating a respective function, for the corresponding instance of time, using the performance metric associated with the trajectory corresponding to the performed behavior of the vehicle 102 at that time. As described above, the correctness metric can indicate how incorrect a performed behavior of the vehicle 102 is at a particular time. That is, a correctness metric at or close to 0 indicates a "correct" and "less/least incorrect" performed behavior and a correctness metric at or close to 1 indicates an "incorrect" and "more/most incorrect" performed behavior. In at least one example, each correctness metric can be combined with a corresponding performance metric (e.g., by multiplying the correctness metric and the performance metric) to get a combined metric, which can represent a deviation from "good" behavior. In at least one example, if the combined metric is below a threshold, indicating incorrect behavior, one or more components and/or systems of the vehicle 102 can be updated to improve performance (and thus quality). In some examples, combined metrics can be aggregated overtime to obtain a stage-wise view of the quality of component(s) and/or system(s) of the vehicle 102 during a period of time associated with the scenario.

Figure 2:
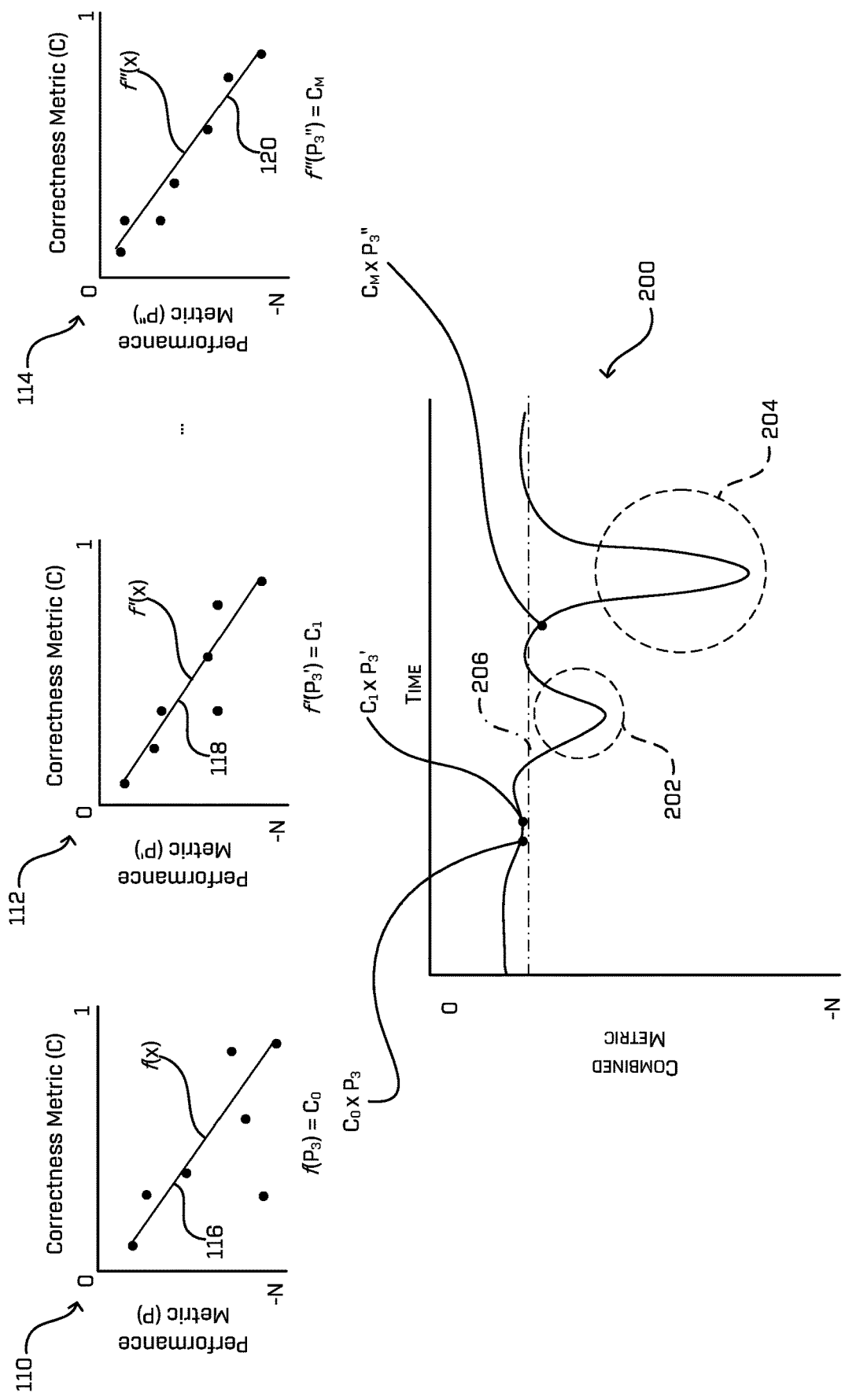
FIG. 2 illustrates an example graph that can be generated based at least in part on a plurality of combined metrics associated with the scenario, as described herein.

In at least one example, combined metrics can be plotted into another graph 200, as illustrated in FIG. 2. Again, the graph 200 is provided for illustrative purposes and may not be required for implementation. In at least one example, combined metrics can be sorted and/or analyzed to determine a function that can be used to identify sub-optimal performance, as described below. Nevertheless, sorting and/or analyzing the combined metrics over time can yield additional information, such as by utilizing derivatives, concavity, and/or other trends over time to identify sub-optimal performance.

In the graph 200, the x-axis can represent time and the y-axis can represent combined metrics. As such, the graph 200 can illustrate combined metrics over time (e.g., associated with the scenario). Each of the combined metrics can comprise individual points on the graph. In at least one example, portions of the graph that are below a threshold (e.g., portion 202 and/or portion 204) can indicate that the vehicle 102 did not perform the correct behavior during the associated period of time. An example threshold line 206 is illustrated in FIG. 2, such that portions of the graph 200 that are below the threshold line 206 can indicate that the vehicle 102 did not perform the correct behavior. In at least one example, sensor data associated with such period of time (e.g., a first period of time associated with the portion 202, a second period of time associated with the portion 204) can be accessed and analyzed to determine how to improve component(s) and/or system(s) associated therewith. In some examples, data associated with the graph 200 can be used to identify situations wherein the vehicle 102 incurred a large cost, identify whether cost-incurring situations have something in common (e.g., can situations be grouped), and/or identify component(s) and/or system(s) that are causing the cost-incurring situations.

In at least one example, by generating a combined metric from the performance metric and the correctness metric, and plotting the combined metrics over time, the resulting plot can take into account stage-wise costs (e.g., where did the vehicle 102 perform poorly in a bad situation?). That is, a combined metric with a large negative value (farther away from zero) can indicate that the vehicle 102 performed poorly in a bad situation, wherein a combined metric with a smaller negative value (e.g., closer to zero) can indicate that the vehicle 102 performed well in the bad situation. In some examples, portions of the graph 200 where derivatives become large in magnitude quickly (e.g., concave portions of the graph 200) can indicate a more significant problem. As such, a developer can focus on modifying and/or otherwise updating component(s) and/or system(s) associated with such portions of the graph before turning to other component(s) and/or system(s). For example, in FIG. 2, a developer can prioritize improving the portion of the graph 204 before the portion of the graph 202.

In at least one example, based on a determination that component(s) and/or system(s) of the vehicle 102 performed sub-optimally (e.g., combined metric(s) are below a threshold), a modification and/or update can be made to the component(s) and/or system(s) in an effort to improve the performance of the component(s) and/or system(s) (and thus, quality associated therewith). In some examples, component(s) and/or system(s), or portions thereof, that control the vehicle 102 can be referred to as "control component(s)." In at least one example, based on a determination that component(s) and/or system(s) of the vehicle 102 performed sub-optimally (e.g., combined metric(s) are below a threshold), a modification and/or update can be made to a control component.

As described above, in some examples, a developer can modify software code associated with a component and/or system in an effort to improve a performance metric and/or correctness metric (and thus, the combined metric). For instance, a developer can determine to modify thresholds indicating when the vehicle 102 should yield or not yield, a developer can change the algorithms used to determine behavior, a developer can change a localization model used by a localization component, a developer can update a prediction model used by a prediction component, a developer can change a perception model used by a perception component, a developer can change a planner model used by a planner component, and/or the like. In some examples, a sensor component and/or system can be calibrated or recalibrated in an effort to improve a performance metric and/or correctness metric. Similarly, such metrics may be used for reinforcement learning on the vehicle (e.g., using on-line training of machine learned systems for continuous improvement) or for informing the vehicle of a maneuver to perform (either presently or in the future).

In some examples, after a modification and/or update is made, the process described above with reference to FIGS. 1 and 2 can be repeated to determine whether the correctness metric has improved. If the correctness metric improved (e.g., is closer to zero (0)), the modification, correction, and/or the like improved the quality of the component(s) and/or system(s). If the correctness metric has not improved and/or has not improved more than a threshold, the modification, correction, and/or the like may not have improved the quality of the component(s) and/or system(s) and additional or alternative updates can be made.

Figure 3:
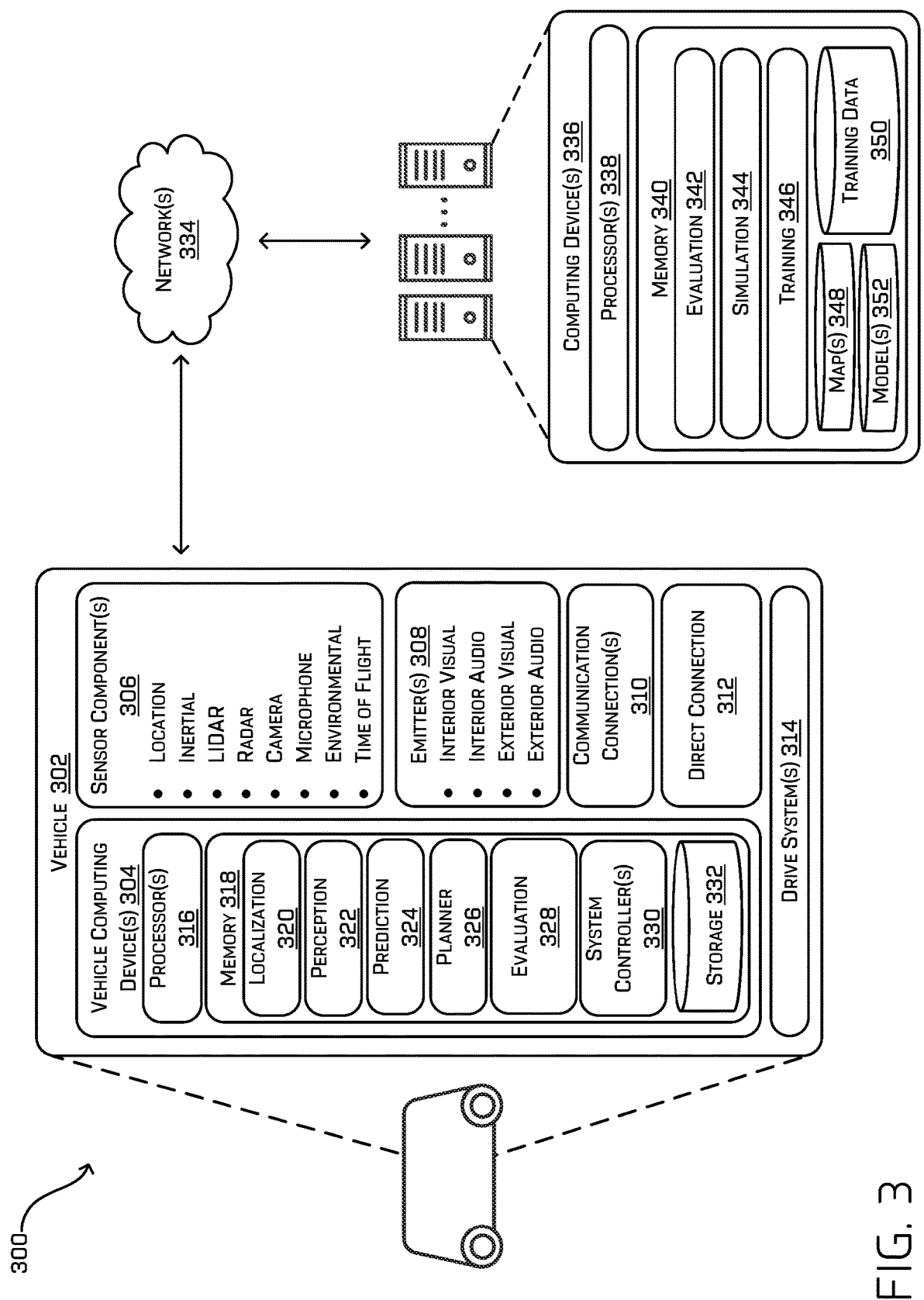
FIG. 3 is a block diagram illustrating an example system for performing techniques, as described herein.

FIG. 3 is a block diagram illustrating an example system 300 for performing techniques, as described herein. In at least one example, a vehicle 302 can include one or more vehicle computing devices 304, one or more sensor components 306, one or more emitters 308, one or more communication connections 310, at least one direct connection 312, and one or more drive systems 314. In at least one example, a vehicle 302 can correspond to the vehicle 102 described above with reference to FIG. 1. In some examples, the vehicle 302 is an autonomous vehicle, as described above with reference to FIG. 1; however, the vehicle 302 could be any other type of vehicle. While only a single vehicle 302 is illustrated in FIG. 3, in a practical application, the example system 300 can include a plurality of vehicles, which, in some examples, can comprise a fleet of vehicles.

The vehicle computing device(s) 304 can include processor(s) 316 and memory 318 communicatively coupled with the processor(s) 316. In the illustrated example, the memory 318 of the vehicle computing device(s) 304 stores a localization component 320, a perception component 322, a prediction component 324, a planner component 326, an evaluation component 328, and one or more system controllers 330. Additionally, the memory 318 can include a storage 332, which can store map(s), model(s), etc. A map can be any number of data structures that are capable of providing data about an environment, such as, but not limited to, topologies (such as junctions, lanes, merging zones, etc.), streets, mountain ranges, roads, terrain, and the environment in general. Maps can be associated with real environments or simulated environments. Model(s) can include machine-trained models, as described below.

In at least one example, the localization component 320 can determine a pose (position and orientation) of the vehicle 302 in relation to a local and/or global map based at least in part on sensor data received from the sensor component(s) 306 and/or map data associated with a map (e.g., of the map(s)). In at least one example, the localization component 320 can include, or be associated with, a calibration component that is capable of performing operations for calibrating (determining various intrinsic and extrinsic parameters associated with any one or more of the sensor component(s) 306), localizing, and mapping substantially simultaneously.

In at least one example, the perception component 322 can perform object detection, segmentation, and/or classification based at least in part on sensor data received from the sensor component(s) 306. In at least one example, the perception component 322 can receive raw sensor data (e.g., from the sensor component(s) 306). In at least one example, the perception component 322 can receive sensor data and can utilize one or more processing algorithms to perform object detection, segmentation, and/or classification with respect to object(s) identified in the sensor data. In some examples, the perception component 322 can associate a bounding region (or otherwise an instance segmentation) with an identified object and can associate a confidence metric associated with a classification of the identified object with the identified object. In some examples, objects, when rendered via a display, can be colored based on their perceived class.

The prediction component 324 can receive sensor data from the sensor component(s) 306, map data associated with a map (e.g., of the map(s) which can be in storage 332), and/or perception data output from the perception component 322 (e.g., processed sensor data), and can output predictions associated with one or more objects within the environment of the vehicle 302. In at least one example, the planner component 326 can determine outputs, to use to control the vehicle 302 based at least in part on sensor data received from the sensor component(s) 306, map data, and/or any determinations made by the other components of the vehicle 302. In at least one example, such outputs can correspond to trajectories, as described herein.

Additional details of localization components, perception components, prediction components, and/or planner components that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein. In some examples (e.g., where the vehicle 302 is not an autonomous vehicle), one or more of the aforementioned components can be omitted from the vehicle 302. While the components described above are illustrated as "onboard" the vehicle 302, in other implementations, the components can be remotely located and/or accessible to the vehicle 302. Furthermore, while the components are described above as "components," such components can comprise one or more components, which can be part of a system, for performing operations attributed to each of the components.

In at least one example, the evaluation component 328 can analyze sensor data—raw (e.g., from the sensor component(s) 306) or processed (e.g., from the localization component 320, the perception component 322, the prediction component 324, the planner component 326, etc.)—to determine performance metrics and/or correctness metrics, which can be used to evaluate the quality of component(s) and/or system(s) of the vehicle 302. For example, the performance metrics and/or correctness metrics can be used to evaluate the performance of the localization component 320, the perception component 322, the prediction component 324, the planner component 326, and/or the like. In some examples, when the evaluation component 328 is "onboard" the vehicle 302, the evaluation component 328 can receive sensor data in real-time from the sensor component(s) 306, access the plurality of trajectories (which, in some examples can be generated and/or otherwise determined by another one of the components, such as the prediction component 324, and provided to the evaluation component 328), determine the metrics (e.g., the progress metric(s), the proximity metric(s), the performance metric(s), the correctness metric(s), etc.), and evaluate the quality of the component(s) and/or system(s) of the vehicle 302, as described herein.

In at least one example, the localization component 320, the perception component 322, the prediction component 324, and/or the planner component 326 can process sensor data and can send their respective outputs over network(s) 334, to computing device(s) 336. In at least one example, the localization component 320, the perception component 322, the prediction component 324, and/or the planner component 326 can send their respective outputs to the computing device(s) 336 at a particular frequency, after a lapse of a predetermined period of time, in near real-time, etc.

In at least one example, the vehicle computing device(s) 304 can include one or more system controllers 330, which can be configured to control steering, propulsion, braking, safety, emitters, communication, and other systems of the vehicle 302. These system controller(s) 330 can communicate with and/or control corresponding systems of the drive system(s) 314 and/or other systems of the vehicle 302.

In at least one example, the sensor component(s) 306 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), time-of-flight (ToF) sensors, seat sensors, seatbelt sensors, weight sensors, etc. The sensor component(s) 306 can provide input to the vehicle computing device(s) 304. In some examples, the sensor component(s) 306 can preprocess at least some of the sensor data prior to sending the sensor data to the vehicle computing device(s) 304. In at least one example, the sensor component(s) 306 can send sensor data, via the network(s) 334, to the computing device(s) 336 at a particular frequency, after a lapse of a predetermined period of time, in near real-time, etc.

The vehicle 302 can also include one or more emitters 308 for emitting light and/or sound. The emitter(s) 308 in this example include interior audio and visual emitters (e.g., display(s), speaker(s), etc.) to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 308 can be positioned at various locations about the exterior and/or interior of the vehicle 302.

The vehicle 302 can also include communication connection(s) 310 that enable communication between the vehicle 302 and other local or remote computing device(s). For instance, the communication connection(s) 310 can facilitate communication with other local computing device(s) on the vehicle 302 and/or the drive system(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 can include physical and/or logical interfaces for connecting the vehicle computing device(s) 304 to another computing device or a network, such as network(s) 334. For example, the communications connection(s) 310 can enable Wi-Fi-based communication such as via frequencies defined by the IEEE 802.11 standards, short range wireless frequencies such as BLUETOOTH, or any suitable wired or wireless communications protocol that enables the respective computing device to interface with the other computing device(s).

The direct connection 312 can directly connect the drive system(s) 314 and other systems of the vehicle 302.

In at least one example, the vehicle 302 can include drive system(s) 314. In some examples, the vehicle 302 can have a single drive system 314. In at least one example, if the vehicle 302 has multiple drive systems 314, individual drive systems 314 can be positioned on opposite ends of the vehicle 302 (e.g., the front and the rear, etc.). In at least one example, the drive system(s) 314 can include sensor component(s) to detect conditions of the drive system(s) 314 and/or the surroundings of the vehicle 302. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 314. In some cases, the sensor component(s) on the drive system(s) 314 can overlap or supplement corresponding systems of the vehicle 302 (e.g., sensor component(s) 306).

The drive system(s) 314 can include many of the vehicle systems, including a high voltage battery, a motor to propel the vehicle 302, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 314. Furthermore, the drive system(s) 314 also include communication connection(s) that enable communication by the respective drive system with other local or remote computing device(s).

In FIG. 3, the vehicle computing device(s) 304, sensor component(s) 306, emitter(s) 308, and the communication connection(s) 310 are shown onboard the vehicle 302. However, in some examples, the vehicle computing device(s) 304, sensor component(s) 306, emitter(s) 308, and the communication connection(s) 310 can be implemented outside of an actual vehicle (i.e., not onboard the vehicle 302). Furthermore, in some examples, aspects of the vehicle computing device(s) 304 can be distributed within the vehicle and/or other computing device(s) 336.

As described above, the vehicle 302 can send sensor data to the computing device(s) 336, via the network(s) 334. In some examples, the vehicle 302 can send raw sensor data to the computing device(s) 336. In other examples, the vehicle 302 can send processed sensor data and/or representations of sensor data to the computing device(s) 336 (e.g., data output from the localization component 320, the perception component 322, the prediction component 324, and/or the planner component 326). In some examples, the vehicle 302 can send sensor data to the computing device(s) 336 at a particular frequency, after a lapse of a predetermined period of time, in near real-time, etc. In some examples, such data can be associated with "logs" that can represent previous, or historical, behavior of the vehicle 302 over time.

The computing device(s) 336 can receive the sensor data (raw or processed) from the vehicle 302 and/or other data collection devices, as well as data from one or more third party sources and/or systems. In at least one example, the computing device(s) 336 can include processor(s) 338 and memory 340 communicatively coupled with the processor(s) 338. In the illustrated example, the memory 340 of the computing device(s) 336 stores an evaluation component 342, a simulation component 344, a training component 346, map(s) 348 (e.g., storing one or more maps), training data 350 (e.g., storing training data accessible to the training component 346), and model(s) 352 (e.g., models output by the training component 346). In some examples, one or more of the systems and/or storage repositories can be associated with the vehicle 302 or other computing device(s) associated with the system 300 instead of, or in addition to, being associated with the memory 340 of the computing device(s) 336.

In at least one example, the evaluation component 342 can perform same or similar operations as the evaluation component 328. In some examples, the evaluation component 342 can access logs, representative of historical sensor data and/or sensor data previously received, from which scenarios can be detected. In some examples, the evaluation component 342 can utilize the simulation component 344 to simulate execution of trajectories, as described herein. Such simulation(s) can enable the evaluation component 342 to determine performance metric(s) and/or correctness metric(s), as described above. The evaluation component 342 can utilize the performance metric(s) and/or correctness metric(s) to evaluate quality of the vehicle 302 (e.g., component(s) and/or system(s) associated therewith).

In at least one example, the training component 346 can train model(s) based at least in part on the training data, which can be used for various operations as described herein. For example, the training component 346 can train model(s), using machine learning algorithms, that can be used by the localization component 320, the perception component 322, the prediction component 324, the planner component 326, the evaluation component 328 and/or the evaluation component 342, for example. Such machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), other Deep Belief Networks (DBN), Artificial Neural Network (ANN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc. In at least one example, the resulting model(s) can be stored in the model(s) 352 and/or the storage 332 on the vehicle 302 and can be accessed in near real-time by one or more components of the vehicle computing device(s) 304.

The processor(s) 316 of the vehicle 302 and the processor(s) 338 of the computing device(s) 336 can be any suitable processor capable of executing instructions to process data and perform operations as described herein. By way of example and not limitation, the processor(s) 316 and 336 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 340 are examples of non-transitory computer-readable media. Memory 318 and 340 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing data. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in some examples, components of the vehicle 302 can be associated with the computing device(s) 336 and/or the components of the computing device(s) 336 can be associated with the vehicle 302. That is, the vehicle 302 can perform one or more of the functions associated with the computing device(s) 336, and vice versa. Furthermore, in some examples, processing as described herein can be distributed across multiple processors (e.g., GPUs) for quick integration. In at least one example, each of the processors (e.g., GPUs) can process in parallel to speed up the time required for performing operations described herein.

Furthermore, while the vehicle computing device(s) 304 and the computing device(s) 336 are shown to include multiple components, in some examples, such components can be associated with more or fewer individual components. For example, in an example, a localization component, a perception component, a prediction component, and/or a planner component can be combined into a single component. Or, an evaluation component, a simulation component, and/or a training component can be combined into a single component. That is, while depicted as separate components, any one or more of the components can be combined.

Figure 4:
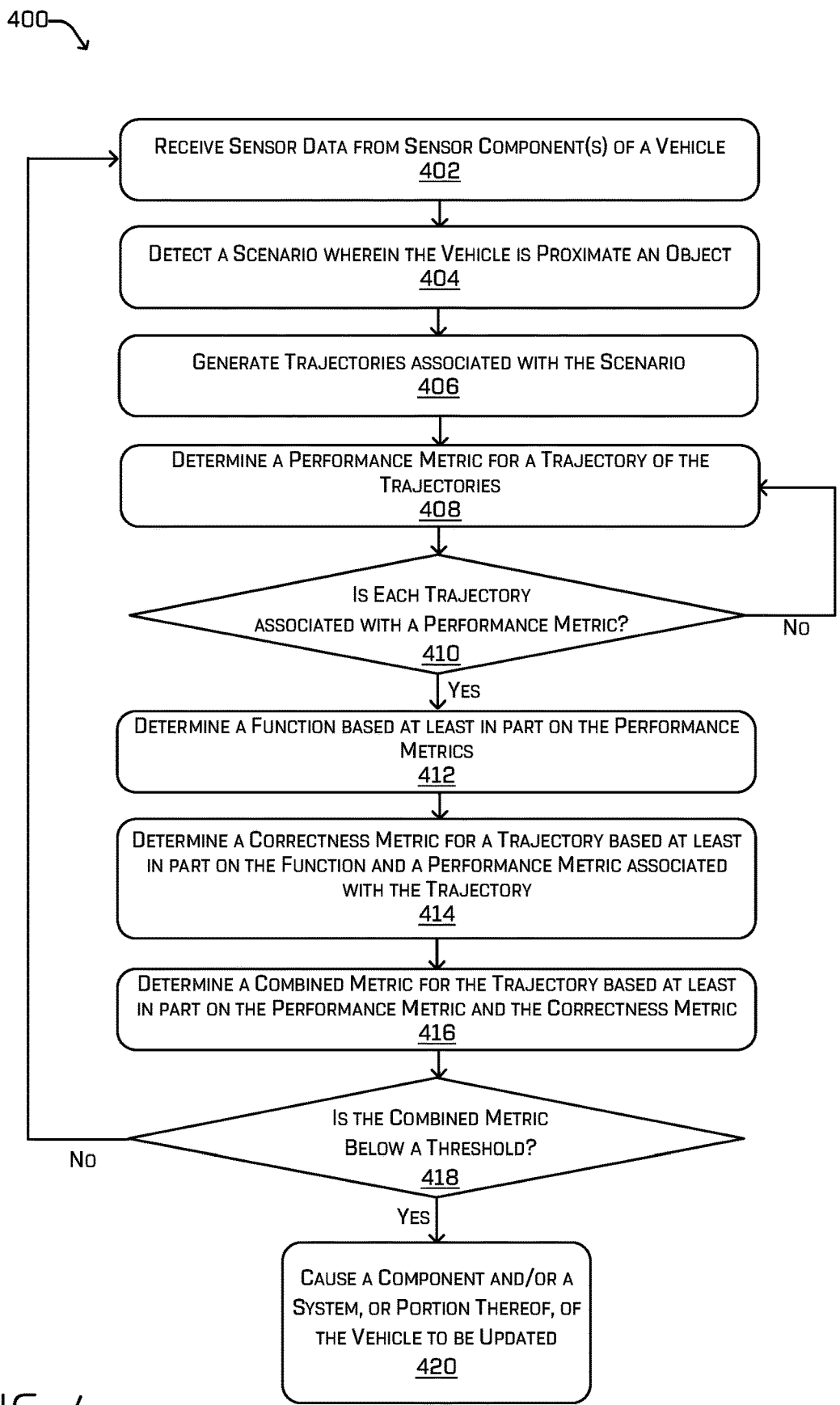
FIG. 4 illustrates an example process for evaluating system quality using performance-based metrics, as described herein.
Figure 5:
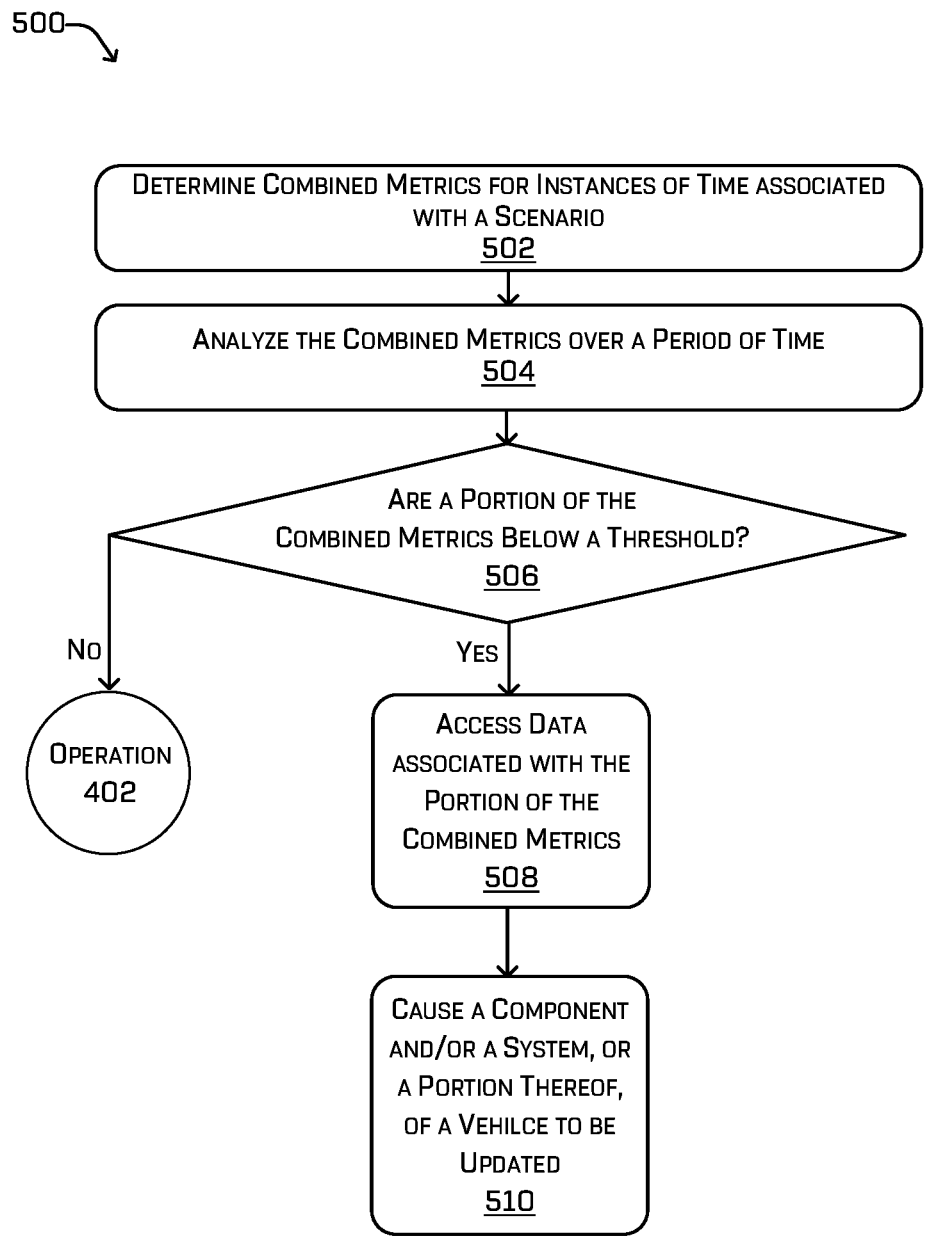
FIG. 5 illustrates another example process for evaluating system quality using performance-based metrics, as described herein.

FIGS. 4 and 5 are flowcharts showing example processes involving techniques as described herein. The processes illustrated in FIGS. 4 and 5 are described with reference to the system 300 shown in FIG. 3 for convenience and ease of understanding. However, the processes illustrated in FIGS. 4 and 5 are not limited to being performed using the system 300. Moreover, the system 300 described herein is not limited to performing the processes illustrated in FIGS. 4 and 5.

The processes 400 and 500 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 400 and 500 can be combined in whole or in part with each other or with other processes.

FIG. 4 illustrates an example process 400 for evaluating system quality using performance-based metrics, as described herein.

At operation 402, the evaluation component 342 can receive sensor data from sensor component(s) of a vehicle. As described above, a vehicle 302 can include sensor component(s) 306. In at least one example, the sensor component(s) 306 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), time-of-flight (ToF) sensors, seat sensors, seatbelt sensors, weight sensors, etc. The sensor component(s) 306 can provide input to the vehicle computing device(s) 304. In some examples, the sensor component(s) 306 can preprocess at least some of the sensor data prior to sending the sensor data to the vehicle computing device(s) 304. In at least one example, the sensor component(s) 306 can send sensor data, via the network(s) 334, to the computing device(s) 336 at a particular frequency, after a lapse of a predetermined period of time, in near real-time, etc. In at least one example, the sensor component(s) 306 can generate sensor data that can represent the environment 100. In at least one example, the evaluation component 328 can receive sensor data from the sensor component(s) 306 (e.g., raw sensor data) or from the localization component 320, the perception component 322, the prediction component 324, and/or the planner component 326 (e.g., processed sensor data).

As described above, in some examples, the sensor data can be received in real-time. In some examples, the sensor data can be associated with stored log data. In some examples, the sensor data can be simulated.

At operation 404, the evaluation component 342 can detect a scenario wherein the vehicle is proximate an object. In at least one example, the evaluation component 342 can analyze the sensor data (e.g., raw or processed) and can detect a scenario in the sensor data and/or based on the sensor data. In some examples, a scenario can be detected using a classifier trained to identify particular scenarios including but not limited to an oncoming in-lane scenario (e.g., when another vehicle is in a same lane, travelling in an opposite direction of the vehicle 302), a cut-in or merge scenario (e.g., when another vehicle travels into a same lane of the vehicle 302, in front of the vehicle 302, and travelling in the same direction as the vehicle 302), etc. In some examples, a scenario can be detected based at least in part on detecting, from the sensor data and/or determination(s) based at least in part on the sensor data, that the vehicle 302 is proximate another vehicle (e.g., within a threshold distance of the other vehicle). In some examples, the sensor data can be obtained in real-time (e.g., while the vehicle 302 is travelling in the environment). In some examples, the sensor data can be obtained at a later time by accessing stored data logs associated with previous travel of the vehicle 302.

At operation 406, the evaluation component 342 can generate trajectories associated with the scenario. In at least one example, the evaluation component 342 can generate a plurality of trajectories associated with the scenario. In at least one example, a trajectory can represent a behavior of the vehicle 302. That is, a trajectory can comprise a sequence of commands that, when executed by a component and/or system of the vehicle 302, can control the vehicle 302 to perform a behavior. In some examples, the plurality of trajectories can be different combinations of jerk, acceleration (e.g., longitudinal or lateral), velocity, position, braking, etc. In at least one example, the simulation component 344 can perform a plurality of simulations of the plurality of trajectories. That is, the simulation component 344 can execute a trajectory to determine the associated behavior. In at least one example, the plurality of simulations can be performed programmatically (e.g., using quasi-Monte Carlo simulation, an optimization problem, and/or the like).

At operation 408, the evaluation component 342 can determine a performance metric for a trajectory of the trajectories. In at least one example, a performance metric can be determined for each of the trajectories. In at least one example, the performance metric can be determined based at least in part on determining a sum of a progress metric and a proximity metric, as described above. In some examples, the performance metric can have a value between zero (0) and −N, wherein a performance metric close to zero indicates "good" performance and a performance metric close to −N indicates "bad" performance. That is, a performance metric that meets or exceeds a threshold can indicate "good" performance and a performance metric that is below the threshold can indicate "bad" performance. As described above, a performance metric associated with an instance of time can be determined based at least in part on a progress metric, determined from a plurality of progress metrics determined for a period of time associated with the instance of time, and a proximity metric, determined from a plurality of proximity metrics determined for the period of time.

At operation 410, the evaluation component 342 can determine whether each trajectory is associated with a performance metric. In at least one example, after determining a performance metric for a trajectory, the evaluation component 342 can determine whether any trajectory of the plurality of trajectories is not associated with a performance metric. If a trajectory is not associated with a performance metric, the process 400 can return to operation 408 to determine a performance metric for the trajectory. If each trajectory is associated with a performance metric, the process 400 can continue at operation 412.

At operation 412, the evaluation component 342 can determine a function based at least in part on the performance metrics. In at least one example, the evaluation component 342 can add each of the performance metrics to a graph as described above with reference to FIG. 1. As noted above, graphs are provided for illustrative purposes and may not be required for implementation. That is, while described in the context of generating a graph, in some examples, the performance metrics can be sorted and analyzed to determine a line of best fit and/or a function associated therewith, as described below.

In at least one example, a line of best fit can be determined based at least in part on the performance metric(s). In at least one example, a subset of performance metrics can be used to generate a line of best fit. In some examples, the subset can include a "best" performance metric (e.g., closest to zero), a "worst" performance metric (e.g., most negative), and an average performance metric. In some examples, the subset can include additional or alternative performance metrics. In some examples, the subset of performance metrics can include the full set of the performance metrics or some portion thereof. In some examples, the line of best fit can be determined based at least in part on a regression analysis (e.g., linear quadradic, etc.), robust fitting (e.g., non-linear least squares, random sample consensus (RANSAC), etc.), etc., as described above. In at least one example, the line can represent a function.

At operation 414, the evaluation component 342 can determine a correctness metric for a trajectory based at least in part on the function and a performance metric associated with the trajectory. In at least one example, the function can be used to determine a correctness metric representative of how correct a performed behavior (e.g., associated with a particular trajectory of the trajectories) was in the particular scenario (e.g., given possible behaviors the vehicle 302 could have performed). In at least one example, the correctness metric can be determined based at least in part on a performance metric associated with the trajectory (e.g., as determined at operation 408). That is, the evaluation component 342 can evaluate the function for the performance metric to determine the correctness metric for the trajectory. The correctness metric, $C_0$, can indicate how correct the performed behavior associated with the trajectory was, in the given scenario. In at least one example, a correctness metric can be associated with a value between zero (0) and one (1), wherein a correctness metric of zero (0) indicates that the performed behavior was "correct" (e.g., the "most correct," "least incorrect," or "good") and a value of one (1) indicates that the performed behavior was "incorrect" (e.g., the "least correct," "most incorrect," or "bad"). That is, a correctness metric with a value that meets or exceeds a threshold can indicate a "correct" behavior and a correctness metric with a value below the threshold can indicate an "incorrect" behavior.

At operation 416, the evaluation component 342 can determine a combined metric for the trajectory based at least in part on the performance metric and the correctness metric. In at least one example, the correctness metric for the trajectory can be combined with the performance metric of the trajectory (e.g., by multiplying the correctness metric and the performance metric or otherwise) to get a combined metric, which can represent a deviation from "good" behavior.

At operation 418, the evaluation component 342 can determine whether the combined metric is below a threshold. In at least one example, the evaluation component 342 can compare the combined metric to a threshold. The threshold can be associated with a value indicative of "good" behavior. In at least one example, based at least in part on determining that the combined metric meets or exceeds the threshold, the process can return to operation 402. In at least one example, based at least in part on determining that the combined metric is below the threshold, the evaluation component 342 can cause a component and/or system, or portion thereof, of the vehicle 302 to be updated, as illustrated at operation 420.

As described above, in at least one example, based on a determination that component(s) and/or system(s) of the vehicle 302 performed sub-optimally (e.g., combined metric(s) are below a threshold), a modification and/or update can be made to the component(s) and/or system(s) in an effort to improve the performance of the component(s) and/or system(s) (and thus, quality associated therewith). As described above, in some examples, a developer can modify software code associated with a component and/or system in an effort to improve a performance metric and/or correctness metric (and thus, the combined metric). For instance, a developer can determine to modify thresholds indicating when the vehicle 302 should yield or not yield, a developer can change the algorithms used to determine behavior, a developer can change a localization model used by a localization component, a developer can update a prediction model used by a prediction component, a developer can change a perception model used by a perception component, a developer can change a planner model used by a planner component, and/or the like. In some examples, a sensor component and/or system can be calibrated or recalibrated in an effort to improve a performance metric and/or correctness metric. Similarly, such metrics may be used for reinforcement learning on the vehicle (e.g., using on-line training of machine learned systems for continuous improvement) or for informing the vehicle of a maneuver to perform (either presently or in the future).

In some examples, based at least in part on determining that the combined metric is below the threshold, the evaluation component 342 can output a signal to a user interface, component and/or system, and/or the like. In some examples, the signal can cause an update to a component and/or system, or portion thereof, as described above. In some examples, the signal can be associated with a message or other indication that can be presented to a user (e.g., a developer) for identifying and/or targeting a component and/or system, or portion thereof, for updating. Such updates can be integrated into onboard computing component(s) and/or system(s), which can be used for controlling the vehicle 302, as described above.

While the process 400 is directed to utilizing the combined metric to evaluate quality of component(s) and/or system(s) of a vehicle, in some examples, the correctness metric can be used to evaluate the quality of the component(s) and/or system(s) instead of, or in addition to, the combined metric. That is, as described above, in some examples, the correctness metric can be compared to a threshold to determine whether to update and/or modify a component and/or system of the vehicle 302.

In at least one example, the process 400 can be performed for an instance of time associated with the scenario and, in some examples, can be repeated for additional instances of time within a period of time associated with the scenario. In some examples, as described above, an instance of time can be a second, a portion or a second, or the like. As such, resulting performance-based metrics can be evaluated over a period of time (e.g., in a rolling fashion) to identify stagewise costs. FIG. 5 illustrates another example process 500 for evaluating system quality using performance-based metrics, as described herein.

At operation 502, the evaluation component 342 can determine combined metrics for instances of time associated with a scenario. In at least one example, the process 400 can be performed for an instance of time associated with the scenario and, in some examples, can be repeated for additional instances of time within a period of time associated with the scenario.

At operation 504, the evaluation component 342 can analyze the combined metrics over a period of time. In some examples, the combined metrics can be associated with a function that represents the combined metrics over a period of time. In at least one example, combined metrics can be plotted into a graph. Each of the combined metrics can comprise individual points on the graph. In the graph, the x-axis can represent time and the y-axis can represent combined metrics. As such, the graph can illustrate combined metrics over time (e.g., associated with the scenario). An example of such a graph is provided above with reference to FIG. 2. Again, a graph may not be required for implementation and is merely provided for illustrative purposes.

At operation 506, the evaluation component 342 can determine whether a portion of the combined metrics are below a threshold. In at least one example, the evaluation component 342 can evaluate the combined metrics to determine whether portions of the combined metrics are below a threshold. In at least one example, portions of the combined metrics that are below a threshold can indicate that the vehicle 302 did not perform the correct behavior during the associated period of time. In at least one example, based at least in part on determining that a portion of the combined metrics meet or exceed a threshold, the process can return to operation 402 of process 400 to repeat the process described herein. In some examples, the process 500 can terminate after operation 506 (e.g., instead of repeating).

At operation 508, the evaluation component 342 can access data associated with the portion of the combined metrics. In at least one example, based at least in part on determining that a portion of the combined metrics are below a threshold, the evaluation component 342 can access data associated with a period of time with which the portion of the combined metrics corresponds. Such data can include sensor data (e.g., raw or processed), decisions (e.g., made by component(s) and/or system(s) of the vehicle 302, etc.), data associated with component(s) and/or system(s) of the vehicle 302, or portions thereof, and/or the like. The evaluation component 342 can analyze the data to determine how to improve component(s) and/or system(s), or portions thereof, associated therewith and can cause at least one of the component or the system, or a portion thereof, to be updated, as illustrated at operation 510.

As described above, in some examples, a developer can modify software code associated with a component and/or system in an effort to improve a performance metric and/or correctness metric. For instance, a developer can determine to modify thresholds indicating when the vehicle 302 should yield or not yield, a developer can change the algorithms used to determine behavior, a developer can change a localization model used by a localization component, a developer can update a prediction model used by a prediction component, a developer can change a perception model used by a perception component, a developer can change a planner model used by a planner component, and/or the like. In some examples, a sensor component and/or system can be calibrated or recalibrated in an effort to improve a performance metric and/or correctness metric. Similarly, such metrics may be used for reinforcement learning on the vehicle (e.g., using on-line training of machine learned systems for continuous improvement) or for informing the vehicle of a maneuver to perform (either presently or in the future).

In some examples, based at least in part on accessing data associated with the portion of the combined metrics that is below the threshold, the evaluation component 342 can output a signal to a user interface, component and/or system, and/or the like. In some examples, the signal can cause an update to a component and/or system, or portion thereof, as described above. In some examples, the signal can be associated with a message or other indication that can be presented to a user (e.g., a developer) for identifying and/or targeting a component and/or system, or portion thereof, for updating. Such updates can be integrated into onboard computing component(s) and/or system(s), which can be used for controlling the vehicle 302, as described above.

In some examples, after a modification and/or update is made, the processes 400 and/or 500 described above with reference to FIGS. 4 and/or 5 can be repeated to determine whether the correctness metric has improved. If the correctness metric has not improved and/or has not improved more than a threshold, additional or alternative updates and/or modifications can be made to further improve the quality of the systems. In at least one example, updated component(s) and/or system(s) can be provided to the vehicle 302 (and/or other vehicle(s)) to improve the performance of such component(s) and/or system(s) and thus improve the quality of the system.

FIGS. 4 and 5 are described with reference to the evaluation component 342 performing the operations. In additional or alternative examples, the processes 400 and 500 can be performed onboard the vehicle 302, for example while the vehicle 302 is moving within an environment, by the evaluation component 328. In such an example, techniques described herein can be used to critique the performance of the component(s) and/or system(s) of the vehicle 302 while the vehicle 302 is moving in the environment. In some examples, if the correctness metric(s) and/or combined metric(s) are below a threshold, the evaluation component 328 can cause the vehicle 302 to operate using a different set of conditions than what it is currently operating on. For example, the evaluation component 328 can send an instruction to the localization component 320, the perception component 322, the prediction component 324, the planner component 326, and/or the like to use a different model for decision making. As a non-limiting example, if a correctness metric and/or a combined metric indicates that the vehicle 302 is following other vehicles too close, the evaluating component 328 can cause the planner component 326 to change to a model that is more conservative with respect to following behavior. In such an example, such a change can be recommended and implemented in real-time.

While FIGS. 4 and 5 are described with reference to determining that a vehicle 302 is proximate an object, techniques described can be implemented without the vehicle 302 being proximate an object and/or otherwise detecting a scenario. For example, the system controller(s) 330 of a vehicle 302 can track a trajectory and such tracking can be associated with a parameter (e.g., low jerk, minimize energy). In some examples, performance metrics and correctness metrics can be determined, as described herein, to evaluate the performance of the system controller(s) 330 without having first detected an object proximate the vehicle 302.

Processes 400 and/or 500 can be utilized to improve the performance and thus safety of vehicles that are controlled by component(s) and/or system(s). That is, such processes relate to performance-based metrics that not only evaluate performance of component(s) and/or system(s) of a vehicle, but do so in the context of how correctly the component(s) and/or system(s) performed in view of what the component(s) and/or system(s) could have done. As described above, the correctness metric provides an indication of fault to evaluate whether the component(s) and/or system(s) performed poorly due to their poor quality and/or because of the scenario. When it is determined that the component(s) and/or system(s) performed poorly due to their quality, improvements (e.g., an update and/or modification) can be made to improve the performance of the component(s) and/or system(s). Thus, the processes 400 and/or 500 described above can be leveraged to evaluate, and improve, the performance and safety of vehicles, such as autonomous vehicles.

Example Clauses

A. A method comprising: receiving sensor data associated with an environment within which a vehicle is positioned; detecting, based at least in part on the sensor data, an object proximate the vehicle in the environment; generating, in response to detecting the object, a first trajectory and a second trajectory for controlling the vehicle relative to the object; determining, based at least in part on the first trajectory, a first performance metric; determining, based at least in part on the second trajectory, a second performance metric; determining, based at least in part on the first performance metric and the second performance metric, a correctness metric that represents a correctness of the performed behavior; determining that the correctness metric is below a threshold; and updating a component of the vehicle based at least in part on determining that the correctness metric is below the threshold.

B. The method as paragraph A recites, wherein the object (i) is positioned in a same lane as the vehicle and (ii) travelling in an opposite direction as the vehicle, and wherein the one or more of the first performance metric or the second performance metric is based at least in part on a velocity of the vehicle and a proximity of the vehicle relative to the object.

C. The method as paragraph A or B recites, wherein the first performance metric and the second performance metric are two performance metrics of a plurality of performance metrics, the method further comprising: determining a subset of performance metrics of the plurality of performance metrics; determining a line of best fit based at least in part on the subset of performance metrics; determining, based at least in part on the line of best fit, a function; and determining the correctness metric based at least in part on the function.

D. The method as any of paragraphs A-C recites, wherein the component comprises a localization component, a perception component, a prediction component, or a planner component, and wherein the vehicle is an autonomous vehicle.

E. A system comprising: one or more processors; and one or more non-transitory computer-readable media storing instructions that, when executed by the one or more processors, cause the system to perform operations comprising: receiving sensor data associated with an environment within which a vehicle is positioned; detecting, based at least in part on the sensor data, an object proximate an object the vehicle; determining, for an instance of time and based at least in part on a velocity of the vehicle and a proximity of the vehicle relative to the object, a performance metric associated with a trajectory indicative of a performed behavior of the vehicle; determining a correctness metric based at least in part on the performance metric, wherein the correctness metric represents a correctness of the performed behavior; and controlling the vehicle based at least in part on the correctness metric.

F. The system as paragraph E recites, the operations further comprising: determining, for the instance of time, a plurality of trajectories for controlling the vehicle proximate the object, wherein the trajectory comprises one of the plurality of trajectories; and determining a plurality of performance metrics associated with the plurality of trajectories, wherein the performance metric is one of the plurality of performance metrics, and wherein each performance metric of the plurality of performance metrics corresponds to one of the trajectories of the plurality of trajectories.

G. The system as paragraph F recites, the operations further comprising: determining a subset of performance metrics of the plurality of performance metrics; analyzing, based at least in part on a regression, the subset of performance metrics; determining, based at least in part on the regression, a function; and determining the correctness metric based at least in part on the function.

H. The system as paragraph F or G recites, wherein the sensor data is associated with at least one of log data from a current trip of the vehicle, log data from a previous trip of the vehicle, or simulated data.

I. The system as any of paragraphs F-H recites, wherein the plurality of trajectories are a first plurality of trajectories associated with a first instance of time associated with the scenario, the plurality of performance metrics are a first plurality of performance metrics, the performance metric is a first performance metric, the trajectory is a first trajectory, and the correctness metric is a first correctness metric, the operations further comprising: generating a second plurality of trajectories associated with a second instance of time associated with the scenario; determining a second plurality of performance metrics for the second plurality of trajectories, wherein a second performance metric of the second plurality of performance metrics corresponds to a second trajectory of the plurality of trajectories; and determining a second correctness metric based at least in part on the plurality of performance metrics.

J. The system as paragraph I recites, the operations further comprising: determining a first combined metric based on the first performance metric and the first correctness metric; determining a second combined metric based on the second performance metric and the second correctness metric; determining a period of time in which one or more combined metrics are below a threshold value; accessing data associated with the period of time; and updating a component of the vehicle based at least in part on accessing the data associated with the period of time.

K. The system as any of paragraphs E-J recites, wherein the instance of time is associated with a period of time and wherein the performance metric is determined based at least in part on a sum of progress metrics, determined based at least in part on the velocity of the vehicle during the period of time, and a sum of proximity metrics, determined based at least in part on the relative distance between the vehicle and the object during the period of time.

L. The system as any of paragraphs E-K recites, the operations further comprising: determining that the correctness metric meets or exceeds a threshold; and updating a component of the vehicle based at least in part on determining that the correctness metric meets or exceeds the threshold.

M. The system as paragraph L recites, wherein the component comprises a localization component, a perception component, a prediction component, or a planner component, and wherein the vehicle is an autonomous vehicle.

N. One or more non-transitory computer-readable media storing instructions that, when executed by one or more processors, cause the one or more processors to perform operations comprising: receiving sensor data associated with an environment within which a vehicle is positioned; determining, at an instance of time, a performance metric associated with a trajectory indicative of a performed behavior of the vehicle; determining a function based at least in part on the performance metric; determining a correctness metric based at least in part on the function, wherein the correctness metric represents a correctness of the performed behavior; and output a signal based at least in part on the correctness metric.

O. The one or more non-transitory computer-readable media as paragraph N recites, wherein the performance metric is determined based at least in part on a velocity associated with the vehicle, as determined based at least in part on the trajectory.

P. The one or more non-transitory computer-readable media as paragraph N or O recites, wherein the performance metric is determined based at least in part on a distance between the vehicle and an object during a period of time associated with the instance of time, as determined based at least in part on the trajectory.

Q. The one or more non-transitory computer-readable media as any of paragraphs N-P recites, the operations further comprising: determining a plurality of trajectories, wherein the trajectory comprises one of the plurality of trajectories; and determining a plurality of performance metrics associated with the plurality of trajectories, wherein the performance metric is one of the plurality of performance metrics, and wherein each performance metric of the plurality of performance metrics corresponds to one of the trajectories of the plurality of trajectories.

R. The one or more non-transitory computer-readable media as paragraph Q recites, the operations further comprising: determining a subset of performance metrics of the plurality of performance metrics; and determining, based at least in part on a regression analysis of the subset, the function.

S. The one or more non-transitory computer-readable media as any of paragraphs N-R recites, the operations further comprising: determining a plurality of correctness metrics, wherein the correctness metric is one of the plurality of correctness metrics, and wherein each correctness metric of the plurality of correctness metrics is associated with individual instances of time; determining, based on the plurality of correctness metrics, a plurality of combined metrics, wherein a combined metric for the trajectory is determined based on the performance metric and the correctness metric; determining that one or more combined metrics of the plurality of combined metrics are below a threshold, wherein the one or more combined metrics are associated with a period of time; and updating a component of the vehicle based at least in part on accessing a data associated with the period of time.

T. The one or more non-transitory computer-readable media as any of paragraphs N-S recites, wherein outputting the signal causes a modification to at least one of a localization component, a perception component, a prediction component, or a planner component, and wherein the vehicle is controllable based at least in part on a result of the modification.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
   receiving sensor data associated with an environment within which a vehicle is positioned;
   detecting, based at least in part on the sensor data, an object proximate the vehicle in the environment;
   generating, in response to detecting the object, a first trajectory and a second trajectory for controlling the vehicle relative to the object;
   determining, based at least in part on the first trajectory, a first performance metric determined as a combination of a first metric associated with an amount of time for the vehicle to progress to a desired state after executing the first trajectory and a second metric associated with a proximity of the vehicle to the object along the first trajectory;
   determining, based at least in part on the second trajectory, a second performance metric;
   determining, based at least in part on the first performance metric and the second performance metric, a correctness metric that represents a correctness of a performed behavior of the vehicle;
   determining a plurality of combined metrics, wherein individual combined metrics of the plurality of combined metrics for the first trajectory and the second trajectory are determined based on the first performance metric, the second performance metric, and the correctness metric;
   determining a period of time in which one or more of the plurality of combined metrics are below a threshold; and
   updating a component of the vehicle based at least in part on accessing data associated with the period of time,
   wherein the correctness metric is associated with a difference between the first trajectory and the second trajectory.

2. The method as claim 1 recites, wherein the object (i) is positioned in a same lane as the vehicle and (ii) travelling in an opposite direction as the vehicle, and wherein the one or more of the first performance metric or the second performance metric is based at least in part on a velocity of the vehicle and a proximity of the vehicle relative to the object.

3. The method as claim 1 recites, wherein the first performance metric and the second performance metric are two performance metrics of a plurality of performance metrics, the method further comprising:
   determining a subset of performance metrics of the plurality of performance metrics;
   determining a line of best fit based at least in part on the subset of performance metrics;
   determining, based at least in part on the line of best fit, a function; and
   determining the correctness metric based at least in part on the function.

4. The method as claim 1 recites, wherein the component comprises a localization component, a perception component, a prediction component, or a planner component, and wherein the vehicle is an autonomous vehicle.

5. A system comprising:
   one or more processors; and
   one or more non-transitory computer-readable media storing instructions that, when executed by the one or more processors, cause the system to perform operations comprising:
   receiving sensor data associated with an environment within which a vehicle is positioned;
   detecting, based at least in part on the sensor data, an object proximate the vehicle;
   determining, for individual instances of time and based at least in part on a velocity of the vehicle and a proximity of the vehicle relative to the object, a plurality of performance metrics, individual performance metrics of the plurality of performance metrics being associated with a trajectory and indicative of a performed behavior of the vehicle, wherein the individual performance metrics are based at least in part on a first metric associated with an amount of time for the vehicle to progress to a desired state after executing the trajectory and a second metric associated with a proximity of the vehicle to the object along the trajectory;
   determining, for the individual instances of time, a plurality of trajectories for controlling the vehicle proximate the object, wherein the trajectory comprises one of the plurality of trajectories;
   determining a correctness metric based at least in part on the plurality performance metrics, wherein the correctness metric represents a correctness of the performed behavior, and the correctness metric is associated with a difference between the plurality of trajectories;
   determining a plurality of combined metrics, wherein individual combined metrics of the plurality of combined metrics for the trajectory are determined based on the individual performance metrics of the plurality of performance metrics and the correctness metric;
   determining a period of time in which one or more of the plurality of combined metrics is below a threshold value;
   updating a component of the vehicle based at least in part on accessing data associated with the period of time; and
   controlling the vehicle based at least in part on the correctness metric.

6. The system as claim 5 recites,
   wherein the individual performance metrics of the plurality of performance metrics corresponds to a trajectory of the plurality of trajectories.

7. The system as claim 6 recites, the operations further comprising:
- determining a subset of performance metrics of the plurality of performance metrics;
- analyzing, based at least in part on a regression, the subset of performance metrics;
- determining, based at least in part on the regression, a function; and
- determining the correctness metric based at least in part on the function.

8. The system as claim 6 recites, wherein the sensor data is associated with at least one of log data from a current trip of the vehicle, log data from a previous trip of the vehicle, or simulated data.

9. The system as claim 6 recites, wherein the plurality of trajectories are a first plurality of trajectories associated with a first instance of time associated with a scenario, the plurality of performance metrics are a first plurality of performance metrics, an individual performance metric of the plurality of performance metrics is a first performance metric, the trajectory is a first trajectory, and the correctness metric is a first correctness metric, the operations further comprising:
- generating a second plurality of trajectories associated with a second instance of time associated with the scenario;
- determining a second plurality of performance metrics for the second plurality of trajectories, wherein a second performance metric of the second plurality of performance metrics corresponds to a second trajectory of the plurality of trajectories; and
- determining a second correctness metric based at least in part on the plurality of performance metrics.

10. The system as claim 9 recites, wherein determining the plurality of combined metrics includes:
- determining a first combined metric based on the first performance metric and the first correctness metric; and
- determining a second combined metric based on the second performance metric and the second correctness metric; and determining the period of time includes:
- determining the period of time in which at least one of the first combined metric or second combined metric are below the threshold value.

11. The system as claim 5 recites, wherein the individual instances of time are associated with the period of time and wherein the individual performance metrics of the plurality of performance metrics are determined based at least in part on a sum of progress metrics, determined based at least in part on the velocity of the vehicle during the period of time, and a sum of proximity metrics, determined based at least in part on a relative distance between the vehicle and the object during the period of time.

12. The system as claim 5 recites, the operations further comprising:
- determining that the correctness metric meets or exceeds a correctness threshold; and
- updating the component of the vehicle based at least in part on determining that the correctness metric meets or exceeds the correctness threshold.

13. The system as claim 12 recites, wherein the component comprises a localization component, a perception component, a prediction component, or a planner component, and wherein the vehicle is an autonomous vehicle.

14. One or more non-transitory computer-readable media storing instructions that, when executed by one or more processors, cause the one or more processors to perform operations comprising:
- receiving sensor data associated with an environment within which a vehicle is positioned;
- determining, at individual instances of time, a plurality of performance metrics associated with a plurality of trajectories, individual performance metrics of the plurality of performance metrics being indicative of a performed behavior of the vehicle and based at least in part on one or more of a speed of the vehicle or a proximity of the vehicle to an object proximate the vehicle, wherein the individual performance metrics are determined based at least in part on a first metric proportional to an amount of time for the vehicle to progress to a desired state after executing a trajectory of the plurality of trajectories and a second metric proportional to the proximity of the vehicle to the object along the trajectory;
- determining a function based at least in part on the plurality of performance metrics;
- determining a correctness metric based at least in part on the function, wherein the correctness metric represents a correctness of the performed behavior, and the correctness metric is associated with a difference between the plurality of trajectories;
- determining a plurality of combined metrics, wherein individual combined metrics of the plurality of combined metrics for the trajectory are determined based on a performance metric of the plurality of performance metrics and the correctness metric;
- determining a period of time in which one or more of the plurality of combined metrics is below a threshold;
- updating a component of the vehicle based at least in part on accessing data associated with the period of time; and
- outputting a signal based at least in part on the correctness metric.

15. The one or more non-transitory computer-readable media as claim 14 recites, wherein the individual performance metrics are determined based at least in part on a velocity associated with the vehicle, as determined based at least in part on the trajectory.

16. The one or more non-transitory computer-readable media as claim 14 recites, wherein the individual performance metrics are determined based at least in part on a distance between the vehicle and the object during a period of time associated with the individual instances of time, as determined based at least in part on the trajectory.

17. The one or more non-transitory computer-readable media as claim 14 recites,
wherein the individual performance metrics of the plurality of performance metrics corresponds to a trajectory of the plurality of trajectories.

18. The one or more non-transitory computer-readable media as claim 17 recites, the operations further comprising:
- determining a subset of performance metrics of the plurality of performance metrics; and
- determining, based at least in part on a regression analysis of the subset, the function.

19. The one or more non-transitory computer-readable media as claim 14 recites, the operations further comprising:
- determining a plurality of correctness metrics, wherein the correctness metric is one of the plurality of correctness metrics, and wherein individual correctness metrics of the plurality of correctness metrics are associated with the individual instances of time; and determining, based on the plurality of correctness metrics, the plurality of combined metrics.

20. The one or more non-transitory computer-readable media as claim 14 recites, wherein outputting the signal causes a modification to at least one of a localization component, a perception component, a prediction component, or a planner component, and wherein the vehicle is controllable based at least in part on a result of the modification.

\* \* \* \* \*